United States Patent [19]

Rikuna

[11] Patent Number: 4,752,678
[45] Date of Patent: Jun. 21, 1988

[54] IC CARD SYSTEM EMPLOYING REMOTE PIN ENTRY CARD

[75] Inventor: Kenji Rikuna, Tokyo, Japan

[73] Assignee: Casio Computer Co., Ltd., Tokyo, Japan

[21] Appl. No.: 889,815

[22] Filed: Jul. 24, 1986

[30] Foreign Application Priority Data

Jul. 31, 1985 [JP] Japan .................................. 60-167495

[51] Int. Cl.⁴ ............................................. G06F 15/30
[52] U.S. Cl. .................................................. 235/380
[58] Field of Search ............... 235/375, 492, 380, 487, 235/492, 379, 381, 382

[56] References Cited

U.S. PATENT DOCUMENTS 3,971,916 7/1976 Moreno .
4,614,861 9/1986 Pavlov et al. ........................ 235/379
4,678,895 7/1987 Tateisi et al. ........................ 235/379
4,683,372 7/1987 Matsumoto .......................... 235/380

Primary Examiner—Roy N. Envall, Jr.
Attorney, Agent, or Firm—Frishauf, Holtz, Goodman & Woodward

[57] ABSTRACT

In an IC (integrated circuit) system, a first IC card owned by a cardholder and a second IC card owned by a person other than the cardholder are employed. The first IC card is a normal IC card having a memory for previously storing a personal identification number. The first IC card includes a comparator. The second IC card is a remote PIN entry card having a keyboard for entering the PIN by a cardholder. After the PIN has been entered by the cardholder in the remote PIN entry card, this card is loaded by the person into a card terminal. Then, the PIN entered in the remote PIN entry card is transferred into the card terminal, and thereafter the PIN of the card terminal is transferred into the IC card so as to identify whether the cardholder is an authorized cardholder or not by comparing in the comparator both the PIN's with each other.

14 Claims, 8 Drawing Sheets

IC CARD SYSTEM EMPLOYING REMOTE PIN ENTRY CARD

BACKGROUND OF THE INVENTION

1. Field of the Invention

The present invention relates to an IC (integrated circuit) card system utilizing an IC card functioning as a credit card and a debit card, and a card terminal operable as a cash register in, for example, restaurants, gas stations, or the like where the location to pay charges is remote from the position where a cardholder exists.

2. Description of the Prior Art

A conventional magnetic card is well known in such an article identification system. The magnetic card has a magnetic coating stripe on which a key code, a confidential number, an account number, etc. are magnetically recorded. These magnetically recorded contents, e.g., the key code are known to at least bank personnel because a cardholder as a user has his duty to disclose his key code to the bank. In general, the magnetically recorded information may be relatively easily accessed by everyone. In view of such an easy access, the private confidential information of the conventional magnetic card may not be kept secret.

Instead of the conventional magnetic card, an IC card incorporating an IC (integrated circuit) module has recently been proposed. Accordingly, no one can easily gain access to the confidential information stored in the IC module.

Although it is very hard to read out the confidential information from the IC card, there is no way to identify the authorized cardholder if the IC card per se is forged. Moreover, another difficulty exists in whether the IC card terminal as the card identifying unit is authorized or not.

In the case of actually performing the transaction using such an IC card, the following method is considered. That is, the IC card is loaded in the card terminal installed in banks, stores, or the like. At this time, the personal identification number (i.e., PIN) is key-input to check the validities of the card and authorized cardholder. Thereafter, a predetermined transaction action with respect to the drawing of a deposit, or payment of charges is executed.

However, in the case of using such a method whereby the IC card is loaded in the card terminal and the personal identification number is key-input by the cardholder upon execution of the payment of the charges, first, there is the possibility such that when the cardholder key-inputs his personal ID number at, a store or the like, such a key-input operation itself may be stolen visually by somebody. Second, in the case where the cardholder uses his IC card at a location where the cardholder is remote from the cash register such as, for example, in restaurant, gas station, or the like, the store clerk must bring the card terminal for the cash register by himself to the side of the user, or the cardholder himself must visit the place where the cash register is installed.

The first problem mentioned above may be solved if the cardholder himself carefully key-inputs his personal identification information so as not to be visually stolen during his key entry. To the contrary, there is no effective measure to solve the second problem. In the restaurant, the atmosphere in the store will be deteriorated because the waiters or customers walk about. In the gas station, the customer must get out of the car, resulting in an inconvenience to him.

An object of the invention is therefore to provide an IC card system which can eliminate the necessity of the cardholder having to visit the card terminal to directly key-input his personal identification information even in, for example, restaurants, gas stations, or the like as well.

Another object of the invention is to provide an IC card system in which the cardholder doesn't need to walk about at a store with his IC card by himself, thereby enabling the atmosphere in the store and the practical use efficiency to be improved.

SUMMARY OF THE INVENTION

The object of the present invention is accomplished by providing an IC card system comprising first IC (integrated circuit) card means owned by a cardholder and including first comparison means, and first memory means for previously storing personal identification information, second IC card means owned by a person other than the cardholder, into which at least the personal identification information is entered by the cardholder, and card terminal means in which said personal identification information entered by the cardholder in the second IC card means is firstly transferred therefrom to the card terminal means, and said transferred personal identification information is secondly fed to the first IC card means so as to identify whether said cardholder who has entered the personal identification information in the second IC card means is an authorized cardholder of said first IC card means or not by comparing in the first comparison means said personal identification information fed to the first IC card means with said personal identification information previously stored in the first IC card means.

BRIEF DESCRIPTION OF THE DRAWINGS

Further features of the invention will become apparent from the following description of a preferred embodiment of the invention taken in conjunction with the accompany drawings.

DETAILED DESCRIPTION OF THE PREFERRED EMBODIMENT

BASIC IDEA

A very basic idea of the present invention will now be summarized.

In an IC card system according to the invention, there are provided a first IC card into which personal identification information (data) is previously stored and a second IC card into which the personal identification information is entered by the cardholder. This second IC card is owned by a person other than the cardholder of the first IC card. The personal identification information which has been input to the card terminal through the second IC card is compared and verified with the personal identification information previously stored in the first IC card. In this manner, the card transaction can be executed without any physical movement of the cardholder or card terminal, because the second IC card is newly employed in this system.

IC CARDS AND CARD TERMINAL

Figure 1:
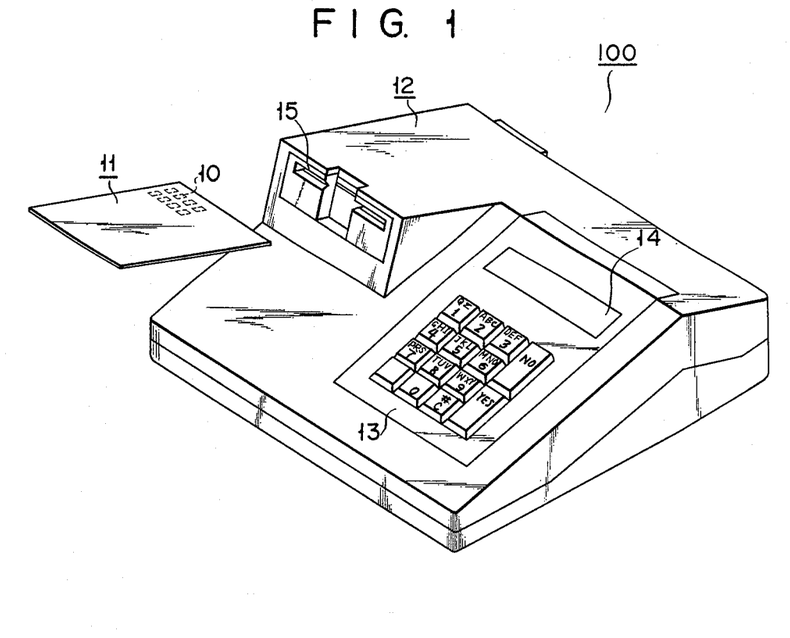
FIG. 1 is an illustration of a user's card and a card terminal employed in an IC card system according to one preferred embodiment of the invention.

FIG. 1 shows a perspective view of a user's card (referred also to as a "first IC card") 11 and a card terminal 12 in an IC card system 100 according to the invention. Card terminal 12 is provided with a keyboard 13, a display section 14, and a card inlet 15 for establishing an electrical connection with a connector 10 of user's card 11. The cardholder possesses user's card 11 by himself. Card terminal 12 is installed near the cash registers in a restaurant or store and the like.

Figure 2:
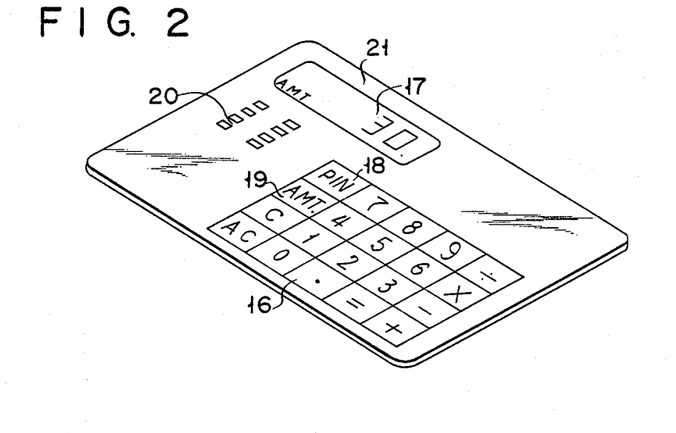
FIG. 2 is an illustration of a remote PIN entry card employed in the IC card system.

FIG. 2 further shows a remote PIN entry card (referred also to as a "second IC card") 21 for use in IC card system 100 of the invention. A keyboard 16 and a display section 17 are provided on the upper surface of the main body of second IC card 21. Keyboard 16 is provided with a PIN entry key 18 and an AMT (amount) entry key 19 together with calculation keys such as numeric entry keys, function keys, and the like. When remote PIN entry card 21 is collated with the authorized cardholder, PIN entry key 18 is used to input the personal identification number (PIN) of the cardholder himself as the above-defined personal identification information. The PIN is the code consisting of a predetermined number of characters which are arbitrarily set by the cardholder. On the other hand, AMT key 19 is used to display e.g., a total amount of a billing calculated by, second IC card 21. For example, AMT key 19 is operated when the cardholder outputs on the side of card terminal 12 an amount of payment calculated on the basis of an amount charging slip. A connector 20 is further provided on the upper surface of the main body of card 21, thereby establishing an electrical connection with card terminal 12 to be installed in a counter of a store or the like. Remote PIN entry card 21 is equipped, for example, on the side of a store, i.e., owned by the store, not the cardholder so that the cardholder can entry his PIN through this remote PIN entry card.

CIRCUIT ARRANGEMENT OF USER'S CARD

Figure 3:
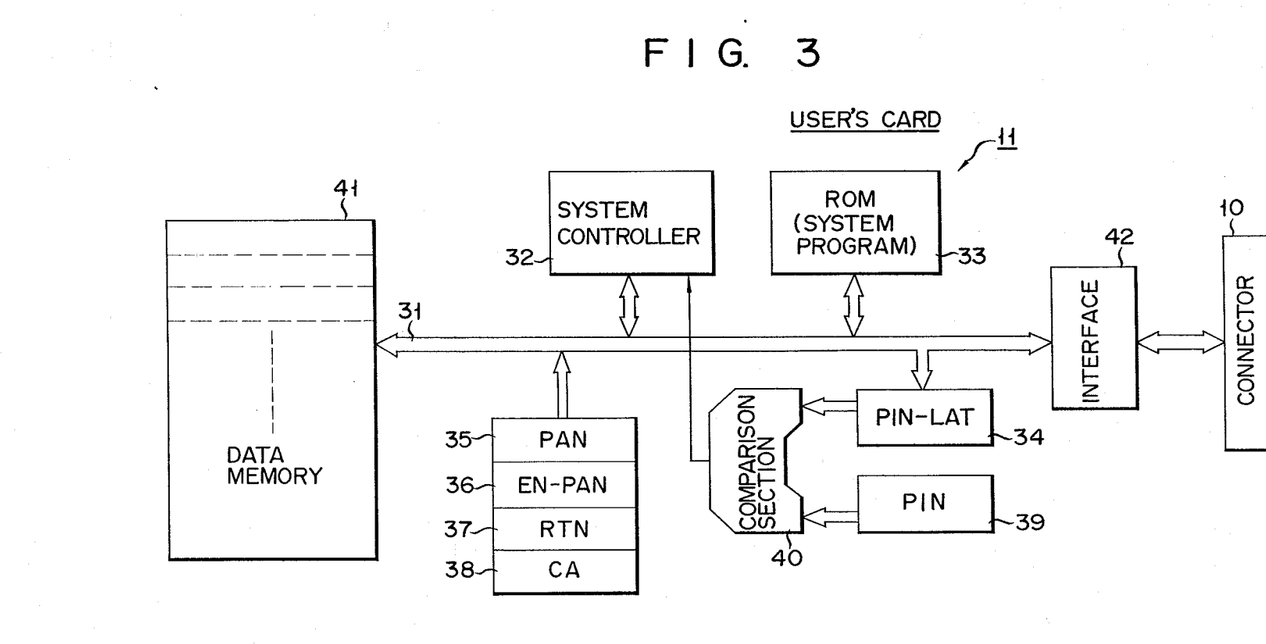
FIG. 3 is a schematic circuit diagram of the user's card shown in FIG. 1.

A circuit arrangement of user's card 11 will now be described with reference to FIG. 3.

In the diagram, a bus line 31 is provided. To this bus line, there are connected: a system controller 32; a ROM 33 in which system programs for this user's card are stored; a PIN latch (PIN-LAT) 34; a PAN memory (PAN: Primary Account Number) 35; an encrypted PAN memory (EN-PAN) 36; an RTN memory (RTN: Retry Number) 37; and a CA memory (CA: Card Authenticator) memory 38. User's card 11 is also provided with a PIN memory 39. The personal identification number (PIN) which has been set by the cardholder himself when first card 11 is issued, is previously stored in PIN memory 39. On the other hand, personal identification information (i.e., PIN) consisting of a predetermined number of characters which are externally input through bus line 31 is latched to PIN latch (PIN-LAT) 34. PIN latch 34 and PIN memory 39 are respectively connected to a personal identification information comparison section 40 as first comparison means. A comparison identification output from comparison section 40 is supplied to system controller 32. A primary account number "PAN" which is preset by the IC card issuer and an encrypted primary account number (EN-PAN) obtained by encrypting the primary account number PAN on the basis of a particular algorithm are stored into PAN memory 35 and encrypted PAN memory 36 respectively. The encrypted primary account number is decrypted by a decrypting public key code (PUK), which will be explained hereinafter. The data retry number (RTN) in the case where PIN data was erroneously input to user's card 11 is stored into RTN memory 37. On the other hand, random 64-bit code "CA" (Card Authenticator) which is used, for example, to encrypt and decrypt a message is stored into CA memory 38. Further, a data memory 41 is connected to bus line 31. Various kinds of data such as a total amount of a billing "AMT" and the like including, e.g., merchant identification code "MID" for every store to which first card 11 was registered and terminal identification code "TID" for every terminal are stored into data memory 41. Each of PAN memory 35, encrypted PAN memory 36, RTN memory 37, CA memory 38, and PIN memory 39 is fabricated by an EPROM (erasable programmable read only memory) or an EEPROM (electrically erasable and programmable read only memory). Only PIN latch 34 is fabricated by a RAM (random access memory). Data memory 41 may be made of an EPROM or an EEPROM. Connector 10 is connected to bus line 31 through an interface 42. It should be noted that ROM 33 stores not only the system program for this user's card, but also attribute data for indicating the presence of the user's card 11.

CIRCUIT ARRANGEMENT OF REMOTE PIN ENTRY CARD

Figure 4:
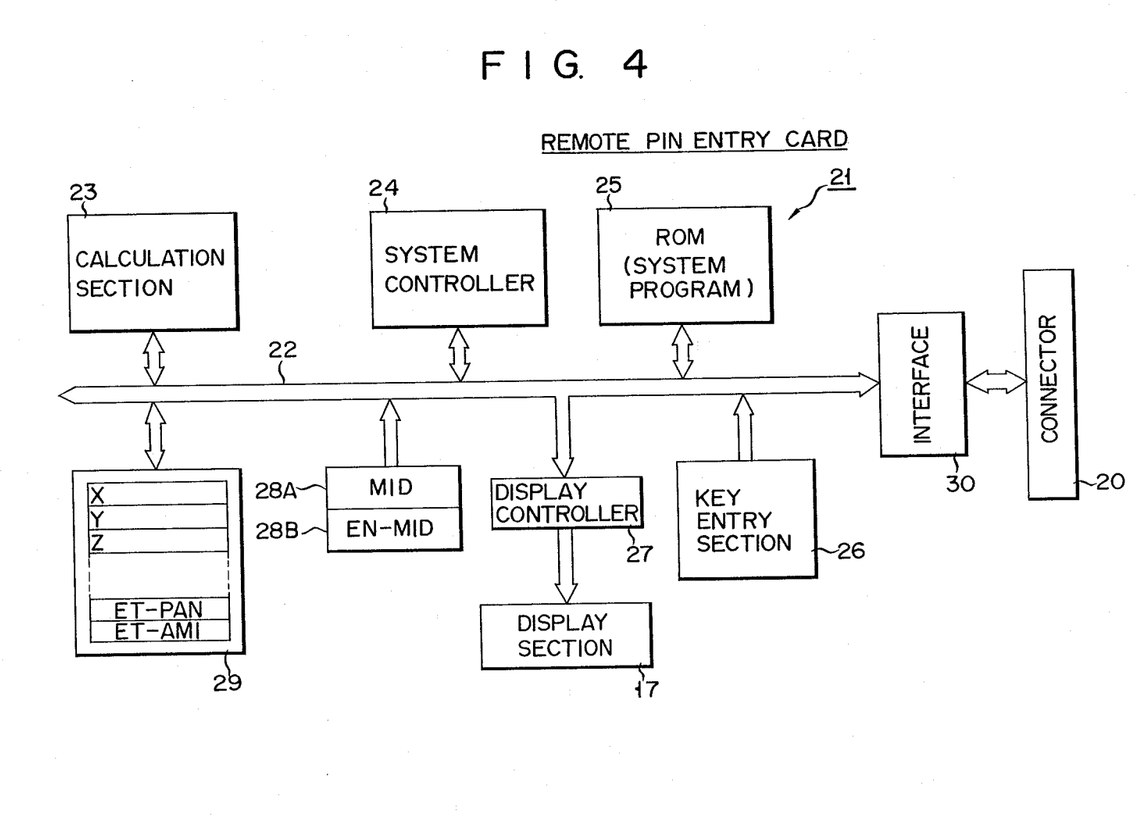
FIG. 4 is a schematic circuit diagram of the remote PIN entry card shown in FIG. 2.

A circuit arrangement of remote PIN entry card or second card 21 will now be described with reference to FIG. 4.

In the circuit diagram, a bus line 22 is provided. To this bus line, there are connected: a calculation section 23; a system controller 24; a ROM 25 in which system programs for this second card are stored; a key entry section 26 to control keyboard 16; a display controller 27 to control display section 17; an MID memory (MID) 28A; and an encrypted MID memory (EN-MID) 28B. The above ROM 25 stores also attribute data for denoting the presence of the remote PIN entry card 21. The merchant identification code "MID" which differs for every store where remote PIN entry card 21 is equipped is stored into MID memory 28A. The encrypted merchant identification code (EN-MID) obtained by encrypting the merchant identification code "MID" on the basis of a particular algorithm is stored into encrypted MID memory 28B. The encrypted merchant identification code is decrypted by a decrypting key code (PUK) (Public Key Code), which will be explained hereinafter. A data RAM 29 is also connected to bus line 22. Various kinds of data with respect to the cardholder such as entered personal identification information "ET-PIN" which has been input through key entry section 26, entered amount of payment "ET-AMT" which was calculated by calculation section 23 through key entry section 26, and the like are stored into RAM 29. Connector 20 is further connected to bus line 22 through interface 30.

CIRCUIT ARRANGEMENT OF CARD TERMINAL

Figure 5:
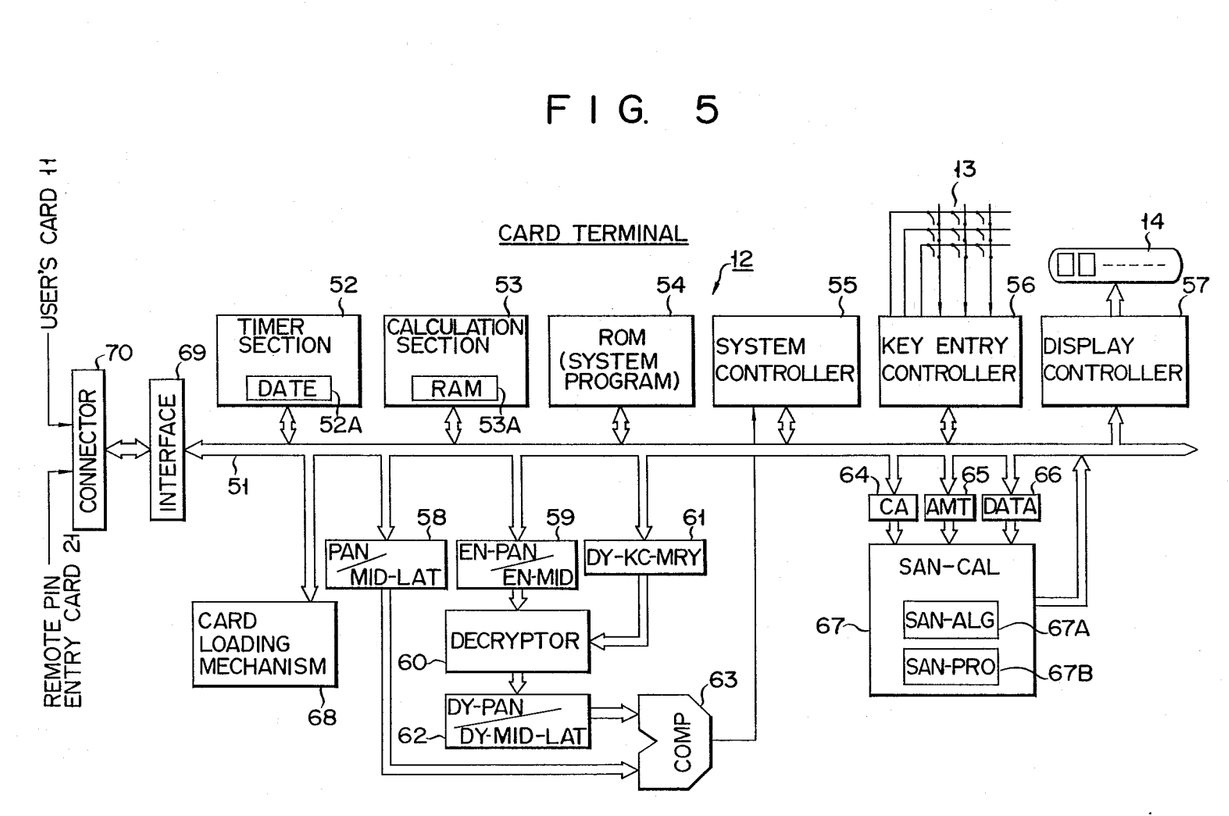
FIG. 5 is a schematic circuit diagram of the card terminal shown in FIG. 1.

A circuit arrangement of card terminal 12 will now be described with reference to FIG. 5.

In this diagram, a bus line 51 is provided. To this bus line, there are connected: a timer section 52; a calculation section 53; a ROM 54 in which system programs for this card terminal are stored; a key entry controller 56 to control system controller 55 and keyboard 13; and a display controller 57 to control display section 14. The system program ROM 54 also stores card terminal attribute data. Timer section 52 is provided with a date register 52A into which date data of eight digits indicative of year, month, and day is set. Calculation section 53 is provided with a RAM 53A for storing calculating data. To bus line 51, there are connected: a PAN/MID latch (PAN/MID-LAT) 58 for latching the PAN data and MID data from user's card (first card) 11 and remote PIN entry card (second card) 21 which ar connected to card terminal 12; and EN-PAN/EN-MID latch (EN-PAN/EN-MID-LAT) 59 for latching the encrypted primary account number PAN and encrypted merchant identification code MID. A decryptor 60 for decrypting each encrypted data is connected to EN-PAN/EN-MID-LAT 59. A decryption key code memory (DY-KC-MRY) 61 for storing the public key code PUK for decryption is connected to decryptor 60, thereby allowing the primary account number (PAN) and merchant identification code (MID) decrypted by the key code in the memory to be latched into a decrypted PAN/MID latch (DY-PAN/DY-MID-LAT) 62. Latches 62 and 58 are respectively connected to a comparison section 63 as second comparison means and a comparison identification signal from comparison section 63 is supplied to system controller 55. A SAN calculation section 67 for making the authorization number when an IC card is used is connected to bus line 51 through a CA register 64, an AMT register 65, and a DATE register 66. A card loading mechanism 68 is also connected to bus line 51. SAN calculation section 67 is provided with a SAN algorithm program memory section 67A and a SAN processor 67B. Card loading mechanism 68 is equipped with a motor (not shown) for conveying user's card 11 or remote PIN entry card 21 inserted from card inlet 15 (see FIG. 1) to a predetermined position. Further, card loading mechanism 68 returns card 11 or 21 which has been subjected to predetermined information exchanging processes to card inlet 15. A connector 70 is also connected to bus line 51 through an interface 69.

SYSTEM OPERATION

A description will now be made of the operation in the case where in IC card system 100 of the above embodiment, for example, the cardholder pays a total amount for foods and drinks in a restaurant by use of user's card (first card) 11 and also remote PIN entry card 21 with reference to flowcharts shown in FIGS. 6, 7A, and 7B.

Figure 6:
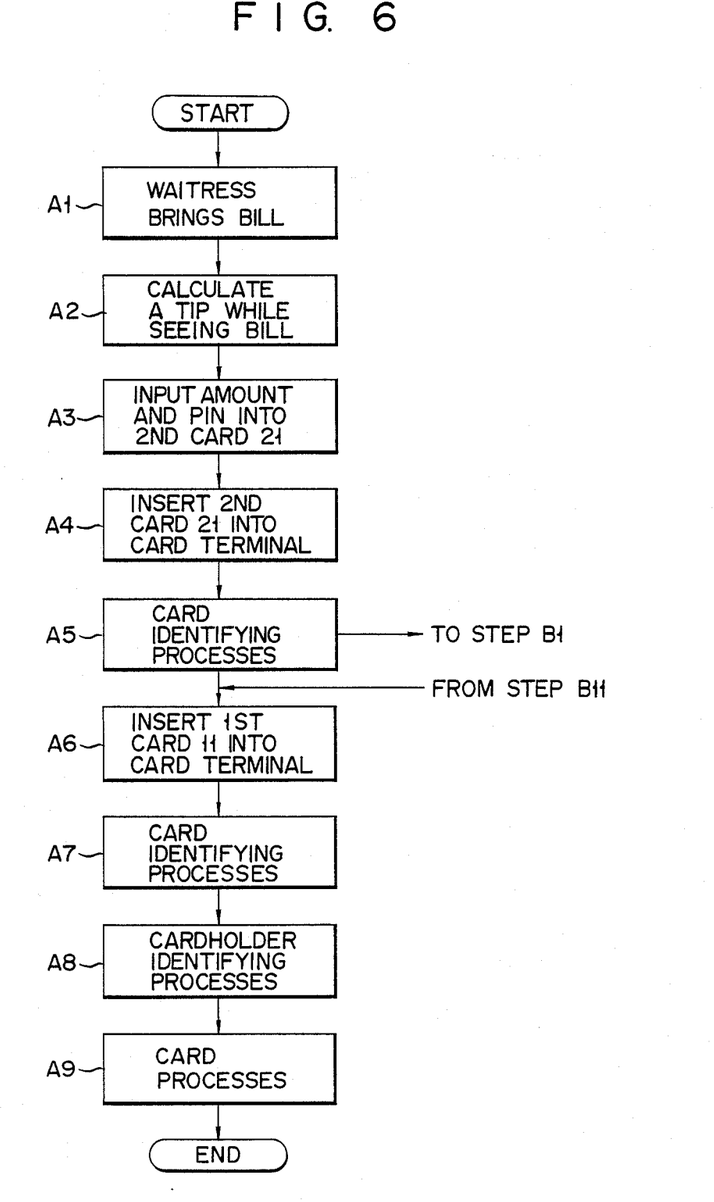
FIG. 6 shows a flowchart for explaining overall operation of the IC card system.
Figure 8:
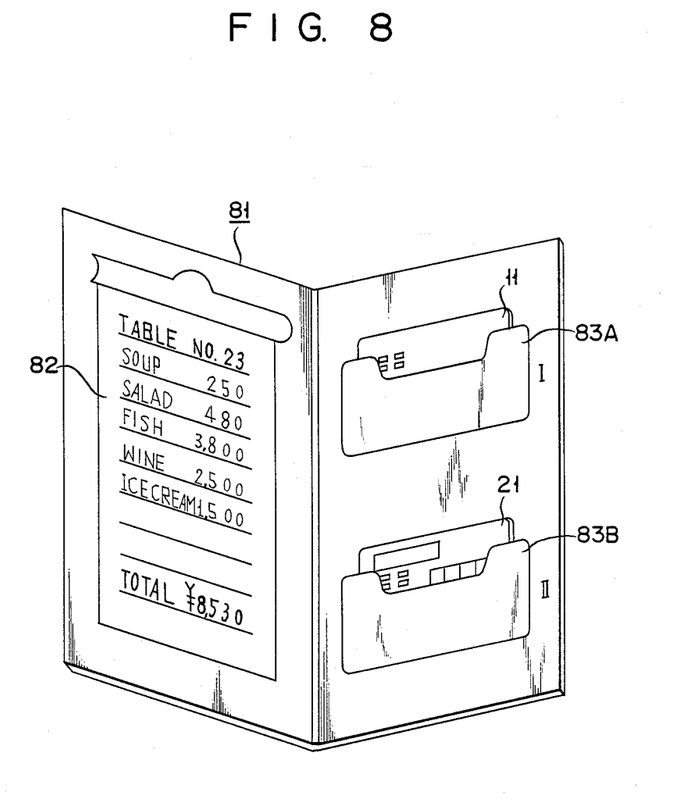
FIG. 8 illustrates a card binder employed in the IC card system.

First, when all of the foods and drinks which were ordered by the cardholder are served, as shown in step A1 in a overall operation flow shown in FIG. 6, a waitress brings an amount bill 82 held in a card binder 81 as shown in, e.g., FIG. 8 and remote PIN entry card (second card) 21 to the table of the cardholder. Then, as shown in step A2 in the flowchart of FIG. 6, for instance, the cardholder calculates an amount of payment on the basis of bill 82 by use of remote PIN entry card 21 during the eating or after completion of the eating. In step A3, the cardholder inputs the calculated total amount of payment AMT by operating AMT key 19 of second IC card 21 and also enters his personal identification number "PIN" by operating PIN entry key 18 of second IC card 21, thereby allowing the PIN to be stored into data RAM 29. Thereafter, the cardholder inserts his own user's card (first card) 11 and remote PIN entry card 21 which have already stored both PIN and AMT data, into first and second cardkeepers 83A and 83B of card binder 81 in FIG. 8, respectively, and then puts card binder 81 on the table. The waitress then brings this card binder 81 from the table to a cash register and inserts remote PIN entry card 21 held in binder 81 into card inlet 15 of card terminal 12 (step A4).

IDENTIFICATION OF SECOND CARD

Figure 7A:
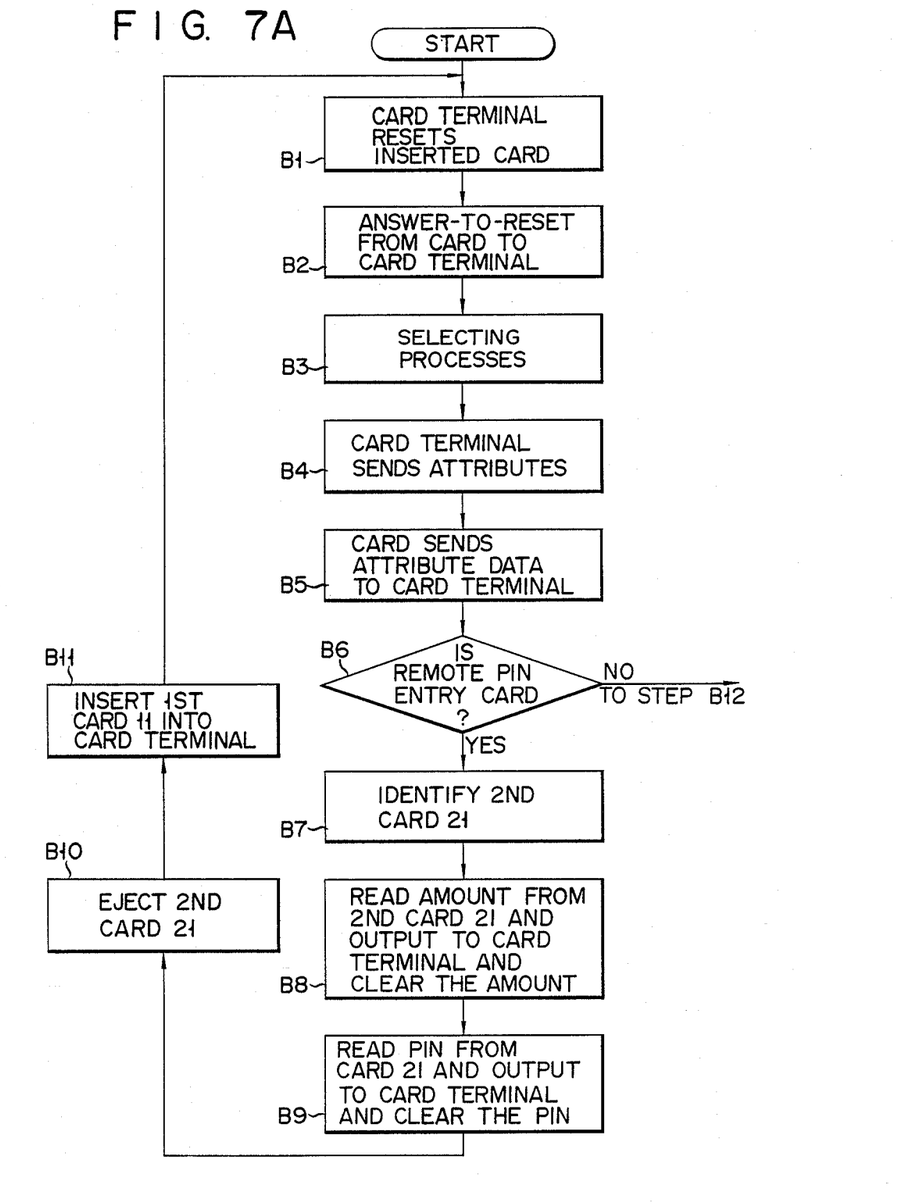
FIGS. 7A and 7B show flowcharts for explaining the card verification performed in the IC card system.

Next, in step A5, card identification processes as shown in steps B1 to B10 shown in FIG. 7A will be executed in card terminal 12. That is, card terminal 12 resets all of the input and output signals for remote PIN entry card 21 as shown in step B1. In the next step B2, remote PIN entry card 21 transmits the operating condition data adaptive to this card to card terminal 12 as answer-to-reset-data, thereby allowing predetermined operating conditions to be set. In step B3, what is called "a selecting process" to check whether card terminal 12 and remote PIN entry card 21 normally operate or not, is executed. In step B4, card terminal 12 transmits the card terminal attribute data, stored in ROM 54, indicative of the kind of this terminal to remote PIN entry card (second card) 21. Card 21 receives the card terminal attribute data and checks to see whether this kind is adaptable to the card terminal or not. On the other hand, in step B5, remote PIN entry card 21 also transmits the card attribute data, stored in ROM 25, indicative of the kind of this card to card terminal 12. Terminal 12 receives the card attribute data and checks to see whether this kind is adaptable to the card terminal or not. The detailed transfer and processes of the card terminal/card attribute data have been disclosed in the specification of Japanese Patent Application No. 60-156834 (1985) by the applicant of the present invention; therefore, their further detailed descriptions are omitted here.

After completion of the mutual checking operations of card terminal 12 and remote PIN entry card 21 as described above, step B6 follows and a check is made to see if the card which is currently connected is remote PIN entry card 21 or not. In this case, since the card connected at present is remote PIN entry card 21, it is YES in step B6 and step B7 follows. This judgement is carried out according to the card attribute data output from ROM 25. In step B7, the merchant identification code "MID" and encrypted merchant identification code "EN-MID" stored in MID memory 28A and encrypted MID memory 28B, respectively, in remote PIN entry card (second card) 21 are first transmitted to terminal 12 through an interface 30 (see FIG. 4). Then, terminal 12 receives the merchant identification code "MID" and encrypted merchant identification code "EN-MID" sent from the side of card 21. The merchant identification code MID is transmitted to PAN/MID latch 58 and the encrypted merchant identification code EN-MID is transmitted to decryptor 60 through EN-PAN/EN-MID latch 59 (see FIG. 5). Decryptor 60 decrypts the encrypted merchant identification code "EN-MID" on the basis of the key code for decryption to be stored into decryption key code memory 61 and latches as MID into decrypted PAN/MID latch 62. Thereafter, comparison section 63 compares and verifies the merchant identification code "MID" to be latched into PAN/MID latch 58 with the decrypted merchant identification code "MID" to be latched into decrypted PAN/MID latch 62. When the code "MID" which is transmitted from remote PIN entry card 21 coincides with the decrypted merchant identification code "MID" decrypted in card terminal 12, the card which is currently connected will be determined to be the valid card legally issued. Thus, step B8 follows and card 21 transmits the AMT data which has been key input and stored into data RAM 29 to the side of terminal 12 and stores therein and at the same time, card 21 clears the AMT data in RAM 29. Further, in step B9, the PIN data which was key input and stored into data RAM 29 is transmitted and stored into terminal 12 and at the same time, the PIN data in RAM 29 is cleared. Thereafter, in step B10, card terminal 12 makes card loading mechanism 68 operative to discharge remote PIN entry card 21 inserted.

After completion of the card collating processes of remote PIN entry card 21, the processing routine is returned to step A6 in FIG. 6 from step B11.

As described in detail above, in the card verification processing operations according to the invention, first, only the card attribute data of the card inserted into card terminal 12 is identified to judge the attribute adaptation based upon the card terminal attribute data stored in ROM 54.

In addition, the validity of this card having the attribute adaptation is judged. In other words, the card-to-card terminal verification operations are executed twice.

IDENTIFICATION OF USER'S CARD

Returning to step A6 in FIG. 6, user's card (first card) 11 inserted into first cardkeeper 83A of card binder 81 shown in FIG. 8 is inserted into card inlet 15 of card terminal 12 (see FIG. 1). Then, in step A7, card terminal 12 executes the card identification processes similar to the above as shown in steps B1 to B10 in FIG. 7A. Namely, card terminal 12 resets all of the input and output signals to and from user's card 11 as shown in step B1. In the next step B2, user's card 11 transmits the operating condition data adapted to this card to card terminal 12 as answer-to-reset-data, thereby setting predetermined operating conditions. In step B3, what is called a selecting process to check whether card terminal 12 and user's card 11 normally operate or not is executed. In step B4, card terminal 12 transmits the card terminal attribute data indicative of the kind of this terminal to user's card 11. Card 11 receives this card terminal attribute data and checks to see whether this kind is adaptable to the card terminal or not. On the other hand, in step B5, user's card 11 also transmits the card attribute data, stored in ROM 33, indicative of the kind of this card to card terminal 12. Terminal 12 receives this card attribute data and checks to see whether this kind is adaptable to the card terminal or not.

After completion of the identification operations of card terminal 12 and user's card 11 in this manner, step B6 follows and a check is made to see if the card which is currently connected is remote PIN entry card 21 or not. In this case, since the card connected at present is user's card 11, it is NO in step B6 and step B12 in FIG. 7B follows. This judgement is performed based upon the card attribute data stored in ROM 33. In step B12, first, the primary account number "PAN" and encrypted primary account number "EN-PAN" stored in PAN memory 35 and encrypted PAN memor 36 in user's card 11 are transmitted to the card terminal 12 through interface 42 (see FIG. 3). Then, terminal 12 receives the PAN and EN-PAN data transmitted from card 11 and transmits the PAN data to PAN/MID latch 58 and transmits the EN-PAN data to decryptor 60 through EN-PAN/EN-MID latch 59. Decryptor 60 decrypts the encrypted primary account number EN-PAN on the basis of the key code for decryption to be stored into decryption key code memory 61, thereby allowing it as (PAN) to be latched into decrypted PAN/MID latch 62. Thereafter, comparison section 63 compares and collates the primary account number PAN to be latched into PAN/MID latch 58 with the decrypted primary account number (PAN) to be latched into decrypted PAN/MID latch 62

When the PAN transmitted from user's card 11 coincides with the (PAN) decrypted by card terminal 12, the card connected at present is determined to be the valid card issued legally. Thus, the card collating processes in step A7 in FIG. 6 are finished and cardholder collating processes as shown in step A8 will be executed. Namely, step B13 in FIG. 7B follows, and a check is made to see if the personal identification number PIN which was key input by the cardholder has been input into card terminal 12 or not. If YES in step B13, namely, when it is decided that the PIN which was key input into remote PIN entry card (second card) 21 in step A3 in FIG. 6 has already been transferred to and stored into terminal 12 in step B9, step B14 follows. The key input PIN data to be stored in terminal 12 is transferred to user's card 11 and latched into PIN latch 34 (see FIG. 3). The key input PIN data latched in PIN latch 34 is collated and compared with the personal identification number (PIN) of the true cardholder or owner of user's card 11 which is preliminarily stored into PIN memory 39 by comparison section 40 in step B15. If YES in step B15, namely, when the PIN data coincides with the (PIN) data and the person who has key input the PIN data for remote PIN entry card 21 in step A3 is determined to be the true cardholder or owner of user's card 11, the collating processes about the cardholder in step A8 in FIG. 6 are finished and the card processes in step A9 will be executed (see FIG. 6).

In step A9, for example, the cash transaction due to the on-line system with a credit company is executed on the basis of the total amount of payment read out of remote PIN entry card 21 in step B8 in FIG. 7A, so that the payment of the bill by the cardholder is completed.

Thereafter, the waitress returns user's card 11 to the cardholder. Namely, since the PIN data which was key input by the cardholder is transferred to card terminal 12 by us of remote PIN entry card 21 which has been preliminarily installed in the store, the cardholder doesn't need to purposely visit the cash register and key input the PIN data but it is sufficient to hand his own user's card (first card) 11 and remote PIN entry card (second card) 21 into which the PIN data was key input to the waitress. Therefore, the deterioration of the atmosphere due to the walk about of the customer in the store can be prevented. In addition, since the key entry operation of the PIN data by the cardholder is executed at the table, the personal identification number will not be stolen by other persons during the key input operation. Further, since a total amount of payment can be also preliminarily calculated and stored into remote PIN entry card 21, when the card transaction processes are executed, the cash register doesn't need to key input an amount of the bill to the customer.

As previously described in the above IC card system 100, three types of identification operations have been executed. First, the personal identification is carried out by introducing the PIN in this system. This personal identification is judged in the user's card 11 when this card 11 is loaded in the card terminal 12. Secondly, the first card identification is performed by employing the PAN as a first key code. This card identification is for the user's card, or first IC card 11, and effected mainly in the card terminal 12 by utilizing the encryptor and decryptor. Finally, the second card identification is executed by utilizing the MID as a second key code for identifying the remote PIN entry card, or the second IC card 21. This card identification is also effected in the card terminal 12 by means of the encryptor and decryptor.

DIFFERENT CARD OPERATION

Figure 7B:
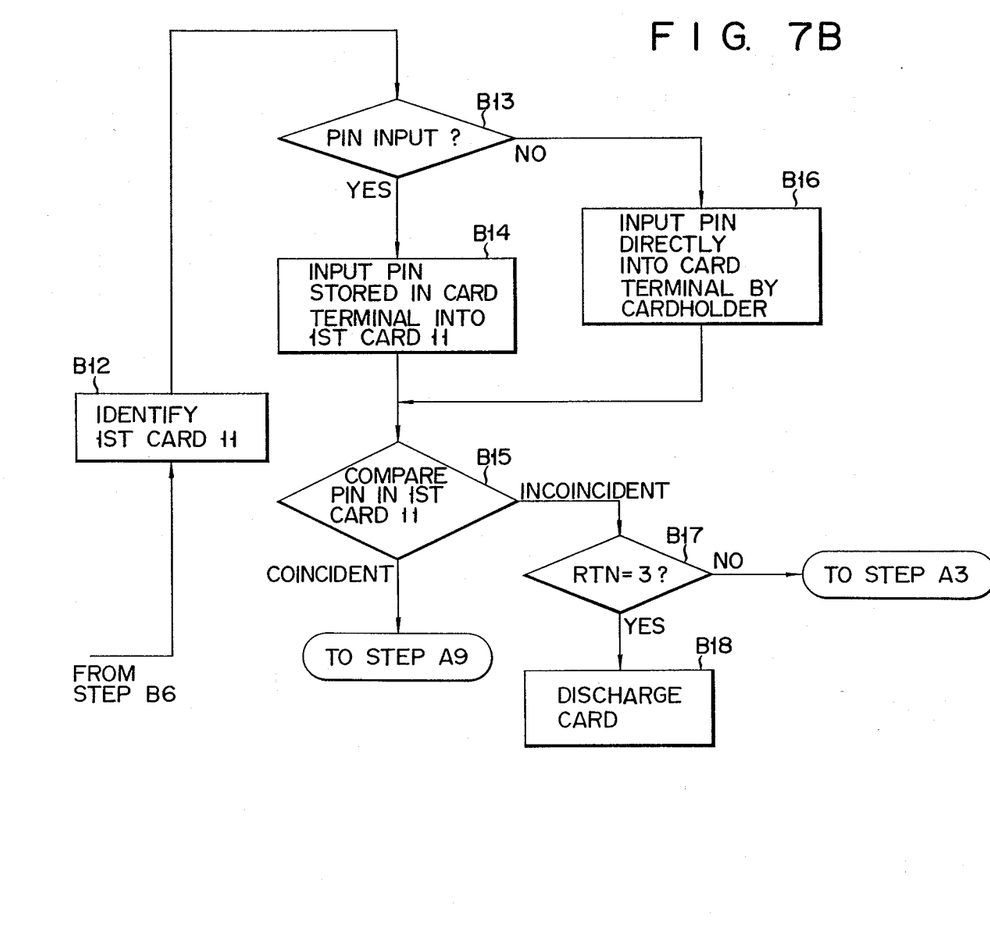

On the other hand, if NO in step B13 in FIG. 7B, namely, when it is determined in ste A3 in FIG. 6 that the PIN data is not key input into remote PIN entry card 21 by the cardholder but user's card 11 has directly been connected to card terminal 12 from the beginning, step B16 follows and the cardholder directly key inputs the PIN data into card terminal 12 (see FIG. 1). Then, step B15 follows and if the key input PIN data coincides with the true PIN which has been previously stored, step A9 follows in FIG. 6 similarly to the above and predetermined card processes will be executed.

Further, if "incoincident" in step B15 of FIG. 7B, namely, if it is determined that the PIN data which was key input into remote PIN entry card 21 in step A3 or the PIN data which was directly key input into card terminal 12 in step B16 doesn't coincide with the true PIN data which has been previously stored, step B17 follows. In step B17, a check is made to see if the number of decision times of incoincidence has reached to three or not. In this case, this number of decision times of incoincidence in step B15 is stored into RTN memory 37 of user's card 11 (see FIG. 3). If NO in step B17, the processing routine is returned to step A3 in FIG. 6 and the cardholder again key inputs the PIN data into remote PIN entry card 21.

To the contrary, if YES in step B17, namely, if the incoincidence of the PIN data has been repeatedly decided three times, system controller 55 of card terminal 12 will determine that there is a large possibility such that the presently loaded user's card 11 is illegally possessed by unauthorized cardholder, so that system controller 55 will transmit a control command to card loading mechanism 68. Thus, user's card 11 is immediately discharged and disconnected from card terminal 12 (see FIG. 5). In this manner, the occurrence of trouble due to the illegal use of the first IC card can be prevented.

Further, in the embodiment, if NO in step B17, the processing routine is returned to step A3 in FIG. 6 and the PIN data is again key input. In place of this, for example, it is also possible to return to step B16 in FIG. 7B and to only directly key input the PIN data again in card terminal 12.

In the embodiment, the operation in the case of performing the card transaction in the restaurant has been described. However, the similar action and effect can be also obtained in, e.g., a gas station and the like where the cash register is remote from the cardholder and the application of use of the invention is not limited.

In the previous embodiment, the card identification for both the first and second IC cards 11 and 21 was performed within one card and personal identification cycle. However, it is sufficient to identify only either the first IC card 11 or the second IC card 21 in combination with the personal identification step.

As described above, according to the invention, the IC card system is provided with the first IC card owned by the cardholder into which personal identification information (PIN) has been previously stored, and the second IC card owned by a person other than the cardholder, into which personal identification information is key-input by the cardholder, and the personal identification information which has been transferred to the card terminal through the second IC card is compared and verified with the first-mentioned personal identification information stored in the first IC card, thereby enabling the card transaction to be executed under the condition that the cardholder need not go to the card terminal for the PIN entry. As a result, for example, in restaurants, gas stations, and the like as well, the atmosphere in the restaurant is not deteriorated and the practical use of the card can be improved.

What is claimed is:

1. An IC card system comprising:
    first IC (integrated circuit) card means owned by a cardholder and including first comparison circuit means, and first memory means for previously storing personal identification information;
    second IC card means owned by a person other than the cardholder, into which at least the personal identification information is entered by the cardholder; and,
    card terminal means in which said personal identification information entered by the cardholder in the second IC card means is firstly transferred therefrom to the card terminal means, and said transferred personal identification information is secondly fed to the first IC card means s as to identify whether said cardholder who has entered the personal identification information in the second IC card means is an authorized cardholder of said first IC card means or not by comparing in the first comparison circuit means said personal identification information fed to the first IC card means with said personal identification information previously stored in the first IC card means.

2. A system as claimed in claim 1, wherein the first IC card means further includes:
    second memory means for previously storing first information to identify said first IC card means, and
    third memory mean for previously storing encrypted said first identifying information; and,
    said card terminal means further includes:
    fourth memory means for previously storing first decrypting key information;
    decryptor means for decrypting said encrypted first identifying information sent from the first IC card means to the card terminal means, based upon said first decrypting key information, so as to derive decrypted first identifying information; and, second comparison circuit means for comparing said first identifying information sent from the first IC card means to the card terminal means with said decrypted first identifying information of the decryptor means so as to identify whether the first IC card means is adaptable to the card terminal means or not.

3. A system as claimed in claim 1, wherein said second IC card means further includes:
fifth memory means for previously storing second information to identify said second IC card means;
sixth memory means for previously storing encrypted said second identifying information, and
fourth memory means of the card terminal means further stores second decrypting key information;
decryptor means of the card terminal means decrypts said encrypted second identifying information sent from the second IC card means to the card terminal means, based upon said second decrypting key information, so as to derive decrypted second identifying information; and,
second comparison circuit means of the card terminal means compares said second identifying information sent from the second IC card means to the card terminal means with said decrypted second identifying information of the decryptor means so as to identify whether said second IC card means is adaptable to the card terminal means or not.

4. A system as claimed in claim 1, wherein said second IC card means further includes a keyboard for keying-in said personal identification information.

5. A system as claimed in claim 4, wherein said second IC card means further includes display means for displaying said keyed-in personal identification information in the alphanumeric form.

6. A system as claimed in claim 1, wherein said personal identification information is a personal identification number.

7. A system as claimed in claim 2, wherein said first identifying information is a primary account number.

8. A system as claimed in claim 3, wherein said second identifying information is a merchant identification code.

9. A system as claimed in claim 2, wherein said first decrypting key information is a public key code.

10. A system as claimed in claim 3, wherein said second decrypting key information is a public key code.

11. A method for identifying an IC card comprising the steps of:
previously storing personal identification information in first memory means of first IC (integrated circuit) card means owned by a cardholder and including first comparison circuit means;
entering by the cardholder the personal identification information into second IC card means owned by a person other than the cardholder;
firstly transferring the personal identification information entered in the second IC card means into card terminal means while the second IC card means is loaded by the person in the card terminal means; and
secondly transferring the personal identification information transferred to the card terminal means into the first IC card means while the first IC card means is loaded by the person in the card terminal means, thereby identifying whether said cardholder who has entered the personal identification information in the second IC card means is an authorized cardholder of said first IC card means or not by comparing in the first comparison circuit means said personal identification information fed to the first IC card means with said personal identification information previously stored in the first IC card means.

12. A method as claimed in claim 11, further comprising the steps of:
previously storing first information to identify said first IC card means in second memory means of said first IC card means;
previously storing encrypted said first identifying information in third memory means of said first IC card means;
previously storing first decrypting key information in fourth memory means of said card terminal means;
decrypting said encrypted first identifying information sent from the first IC card means into the card terminal means, based upon said first decrypting key information stored in said fourth memory means, so as to derive decrypted first identifying information; and,
comparing said first identifying information sent from the first IC card means to second comparison circuit means of the card terminal means with said decrypted first identifying information derived in said decrypting step so as to identify whether the first IC card means is adaptable to the card terminal means or not.

13. A method as claimed in claim 11 further comprising the steps of:
previously storing second information to identify said second IC card means in fifth memory means of said second IC card means;
previously storing encrypted said second identifying information in sixth memory means of said second IC card means;
storing second decrypting key information in fourth memory means of the card terminal means;
decrypting said encrypted second identifying information sent from the second IC card means to the card terminal means, based upon said second decrypting key information, so as to derive decrypted second identifying information; and
comparing said second identifying information sent from the second IC card means to second comparison circuit means of the card terminal means with said decrypted second identifying information derived in said decrypting step so as to identify whether said second IC card means is adaptable to the card terminal means or not.

14. A method as claimed in claim 11, further comprising the steps of:
discriminating said first IC card means from said second IC card means in the card terminal means, based upon two sets of attribute data previously stored in seventh memory means of the first IC card means and eighth memory means of the second IC card means, respectively.

* * * * *